US005680440A

United States Patent [19]
Ghisler et al.

[11] Patent Number: 5,680,440
[45] Date of Patent: Oct. 21, 1997

[54] REGISTRATION AND CONNECTION IN A COMMUNICATION NETWORK

[75] Inventors: Walter Ghisler, Upplands Väsby; Johan Falk, Stockholm; Jan Swerup, Knivsta; Björn Jonsson, Järfälla; Johan Olsson, Sollentuna, all of Sweden

[73] Assignee: Telefonaktiebolaget LM Ericsson, Stockholm, Sweden

[21] Appl. No.: 478,758

[22] Filed: Jun. 7, 1995

Related U.S. Application Data

[63] Continuation of Ser. No. 107,885, Aug. 18, 1993, abandoned.

[30] Foreign Application Priority Data

Aug. 18, 1992 [SE] Sweden .................................. 9202373

[51] Int. Cl.[6] ...................................................... H04Q 7/38
[52] U.S. Cl. ........................................... 379/58; 455/54.1
[58] Field of Search ............................... 379/58, 59, 60, 379/57; 455/33.1, 33.2, 54.1, 56.1

[56] References Cited

U.S. PATENT DOCUMENTS

| | | | |
|---|---|---|---|
| 4,833,701 | 5/1989 | Comroe et al. ............................. | 379/60 |
| 5,090,050 | 2/1992 | Heffernan .................................. | 379/60 |
| 5,210,787 | 5/1993 | Hayes et al. ............................... | 379/60 |
| 5,557,652 | 9/1996 | Jonsson ..................................... | 379/57 |

FOREIGN PATENT DOCUMENTS 0367007  5/1990  European Pat. Off. .

OTHER PUBLICATIONS

Cellular Radiotelecommunications Intersystem Operations: Functional Overview—IS-41.1 (Revision B), *EIA/TIA Project Number 2078*, Jul. 1991.
Cellular Radiotelecommunications Intersystem Operations: Automatic Roaming—IS-41.3 (Revision B), *EIA/TIA Project Number 2078*, Jul. 1991.

*Primary Examiner*—Dwayne Bost
*Assistant Examiner*—William G. Trost
*Attorney, Agent, or Firm*—Burns, Doane, Swecker & Mathis, L.L.P.

[57] ABSTRACT

A mobile radio network includes a number of mobile radio systems, each having a mobile radio services switching center which conveys calls between a number of cordless subscribers and a public switched telephone network which is common to the mobile radio systems which convey calls between a number of cordless subscribers, and a public switched telephone network which is common to the mobile radio systems which convey calls between wire-connected subscribers and also to the cordless subscribers via the mobile radio switching centers. If a cordless subscriber has roamed from its home system to a visitor system, a call from a third system can be transferred generally over the home system and the public network to the subscriber. A service node is assigned to each of the mobile radio systems and each such node keeps an account of where the home subscribers of respective mobile radio systems are located and, in cooperation with other service nodes, can connect a call from a subscriber in the third mobile radio system to the roaming subscriber without needing to load the remaining systems. The system also includes corresponding connection procedures, a subscriber telephone set and a method of registration in the network.

16 Claims, 6 Drawing Sheets

REGISTRATION AND CONNECTION IN A COMMUNICATION NETWORK

This application is a continuation of application Ser. No. 08/107,885, filed Aug. 18. 1993, now abandoned.

TECHNICAL FIELD

The present invention relates to a communication network and more specifically, but not exclusively, to a mobile radio network which includes service nodes that are spread over the regions served by different operators of wire-connected systems or radio systems and terminals that can operate together with these nodes in a manner best suited to the users. The invention also relates to a method of establishing a connection, and to a registration procedure in one such network.

BACKGROUND

The users of telecommunication networks have become progressively more mobile, due to the new possibilities afforded by radio technology. For instance, cellular mobile telephone systems have enabled users in several countries to communicate on a person-to-person basis irrespective of where the parties are located. Even the wire-connected networks afford considerable mobility to present-day subscribers, for instance as a result of the forward connection facilities of such networks.

However, servicing of mobile users is still deficient, partly because the various areas, such as countries or regions in large countries, are controlled by mutually independent wire-connected network or radio network operators, and partly because different standards are applied, for instance standards such as AMPS, TACS, NMT, and so on, and because cooperation between these operators is insufficient.

This deficiency, or shortcoming, is particularly pronounced in the case of long-distance traffic in large countries and in international traffic.

Although the U.S.A. applies standard EIA/TIA IS-41 which enables cellular radio telephony subscribers to obtain services from other operators than their own, the functionality level of such services controlled by foreign operators is lower than the subscriber's own operator and consequently only a minimum of functions are standardized in EIA/TIA IS-41. Furthermore, the standards of competing operators are applied only when forced by their subscribers, and not at all over the whole of the U.S.A.

Different countries, for instance European countries, each have one or more operators. The cooperation between these operators is configured such that they cooperate mutually solely with functions which provide them with income. For instance, if a subscriber in France who is connected to the global mobile radio system GSM calls a GSM-subscriber who resides in Sweden and the Swedish subscriber is in Spain on business and carries his GSM-mobile station with him, the agreement between the operators is that the Swedish operator may not divulge information from his Home Location Register, HLR, so as to enable the French-Spanish connection to be established directly, despite being technically possible in the GSM-system, and the call must be connected through France-Sweden-Spain, because the Swedish operator would have no income from the call if it were established directly.

Interstandard roaming is another problem in long-distance traffic. If a Swedish Nordic Mobile Telephone Network (NMT) subscriber travels to England on business and there hires a TACS mobile telephone, it is impossible for him to debit his NMT subscription, and there is only a limited possibility (only a certain number of digits can be stored for the number referred to) of directing an incoming call from Sweden directly to England. All he can do is to leave a message on an NMT telephone answering machine in Sweden asking the caller to call a given number in England.

The published European Patent Application EP-A2-454, 647 describes a mobile communication system in which the exchange which is located nearest a given A-subscriber who requests an outgoing call to a given B-subscriber collects information concerning the place of residence of the B-subscriber and then establish a connection to this place of residence through the shortest route instead of via domestic exchange of the B-subscriber. The drawback with this solution to finding an optimal connection route is that it can only be used when the mobile radio exchanges concerned belong to one and the same operator or belong to operators which cooperate with one another. It would be desirable to find a general solution which is operator-independent and which can be achieved outside the mobile radio systems concerned in the network.

Swedish Patent Application 9200465-4 describes a method and an arrangement which can be used together with the present invention to solve the aforesaid problems.

SUMMARY OF THE INVENTION

Thus, it is an object of the present invention to make possible effective international and interregional traffic with high functionality to and from persons who otherwise can only reach one another via complicated procedures or can be reached only by non-optimal route selection, or which are given unsatisfactory functionality levels in cooperation between the national or regional operators. When referring to different countries in the following text, this reference is also meant to include the regions of a large country.

This object is realized in accordance with the present invention by spreading an international overlay-network of service nodes (SN) over several countries. Subscribers to cellular or stationary networks are able to subscribe to the SN-services, which stores and maintains updated information concerning the functionality of the subscribers and in which countries the subscribers are located. The subscribers contribute towards maintaining the SN-services updated with regard to their functionality and country of residence, by automatically or manually registering calls with the SN-services when moving from one country to another. The SN-services use the registered information to the connect calls with the desired functionality and over the cheapest route to desired B-subscriber. The SN-service has at least one access node ("service node" or "gateway") per country.

The access nodes form superior home location registers (HLR), in which solely information concerning countries of residence is stored, whereas detailed information concerning places of residence is handled by the cellular mobile telephone system of the country concerned, in its or their home location registers. The SN-nodes are mutually connected through the agency of data links between which information is exchanged with regard to the countries of residence, and are mutually connected via traffic channels (e.g. telephone lines) for subscriber speech and data traffic. Long-distance calls are initiated, for instance, with a service-prefix (020 in Sweden, 800 in the U.S.A., etc.), plus a service number, for instance 123456, which identifies the SN-service and which enables connection to the nearest located SN-node. The desired B-number, for instance 010 3487685, is then sent to the SN-service, which organizes the remainder of the call connection.

Another object of the invention is to offer to subscribers various services which they cannot obtain in the public networks, for instance different call qualities at different prices in the case of long-distance calls, by using different speech coding rates.

A further object of the invention is to offer these services to subscribers without subjecting them to new procedures, as far as possible. This is achieved by special terminals which translate normal number dialling to the special number dialling, e.g. 020 123456 010 3487685, required to connect outgoing long-distance calls via the nearest SN-node. The special terminals may include an analyzer which determines in which cases calls shall be connected via the SN-node and in which cases they shall be set-up directly. The analyzer decision table can be updated from an SN-node in a new country in which the subscriber has just arrived, by sending an updated table to the special terminal.

BRIEF DESCRIPTION OF THE DRAWINGS

The invention will now be described in more detail with reference to the accompanying drawings, in which.

BEST MODES OF CARRYING OUT THE INVENTION

Figure 1:
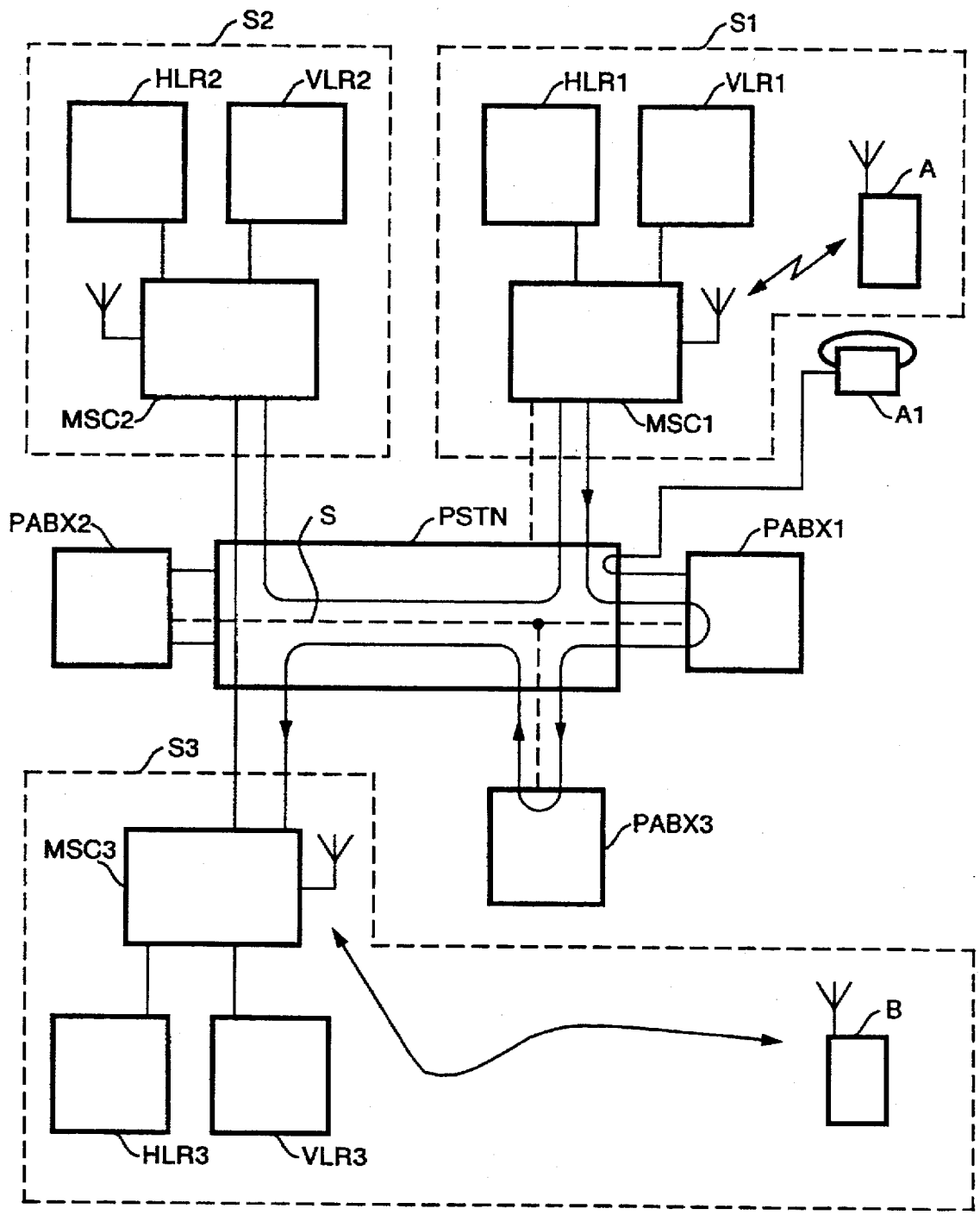
FIG. 1 is a block diagram which illustrates a communication network having three mobile radio systems in accordance with the invention.

FIG. 1 is a block diagram which illustrates schematically three different mobile radio systems in which those blocks relevant to the description of the present invention have been included. All three systems utilize one and the same standard, although the systems have mutually different system identification and may have mutually different operators. It is assumed by way of example and with the intention of facilitating the following description that the common standard is the EIA/TIA IS-54 standard, i.e. the standard adopted by the U.S.A. for mobile radio systems. It is also assumed that the systems S1, S2, S3 are utilized by different operators, i.e. two different operators utilize the systems S2 and S3 and S1, respectively and cooperate mutually so that the three different systems can communicate with one another. Each of the systems has a system identification number (SID) which is characteristic for the system concerned and which is used by the mobile radio units when registering, for instance.

In the illustrated case, the mobile radio system S1 includes a known mobile services switching centre MSC1 which is connected to the wire-connected public switched telephone network PSTN, which connects wire-bound calls to and from subscribers within the area or region covered by the system S1 and which also connects interurban calls to and from the system S1 to remaining systems S2, S3 and between systems in other areas or regions, for instance abroad, when the systems S1–S3 all belong to a certain country.

A given mobile subscriber A, who may be using a mobile telephone, is able to establish a connection, or have a connection established with the mobile services switching centre MSC1 via a base station (not shown in detail) in a known manner, in order to make a call to another mobile or wire-connected subscriber within or outside the system S1. A wire-connected subscriber A1, for instance a typical telephone, may have a connection established at the public switched telephone network PSTN for calls to another wire-connected or cordless subscriber.

In the illustrated case, the mobile radio system S2 also comprises a mobile services switching centre MSC2 of known kind, which is connected to the public switched telephone network PSTN. The illustrated system S2 also includes a Home Location Register (HLR), which contains typically a list of all mobile subscribers that belong to the system S2, the so-called home mobiles, irrespective of where these mobiles are located. The illustrated system S2 also includes a Visitor Location register (a so-called Visitor Location Register—VLR), which includes a list of the mobiles that have roamed into the system S2 as visitors but which belong to other mobile radio systems.

Similarly, the illustrated mobile radio system S3 includes a mobile services switching centre MSC3 and associated home location register HLR3 and visitor location register VLR3. It is assumed that the subscriber referenced B in FIG. 1 with whom the A-subscriber in system S1 wishes to establish a call has roamed from his home system, system S2, and at the time of the call from subscriber A is located in system S3.

Figure 2:
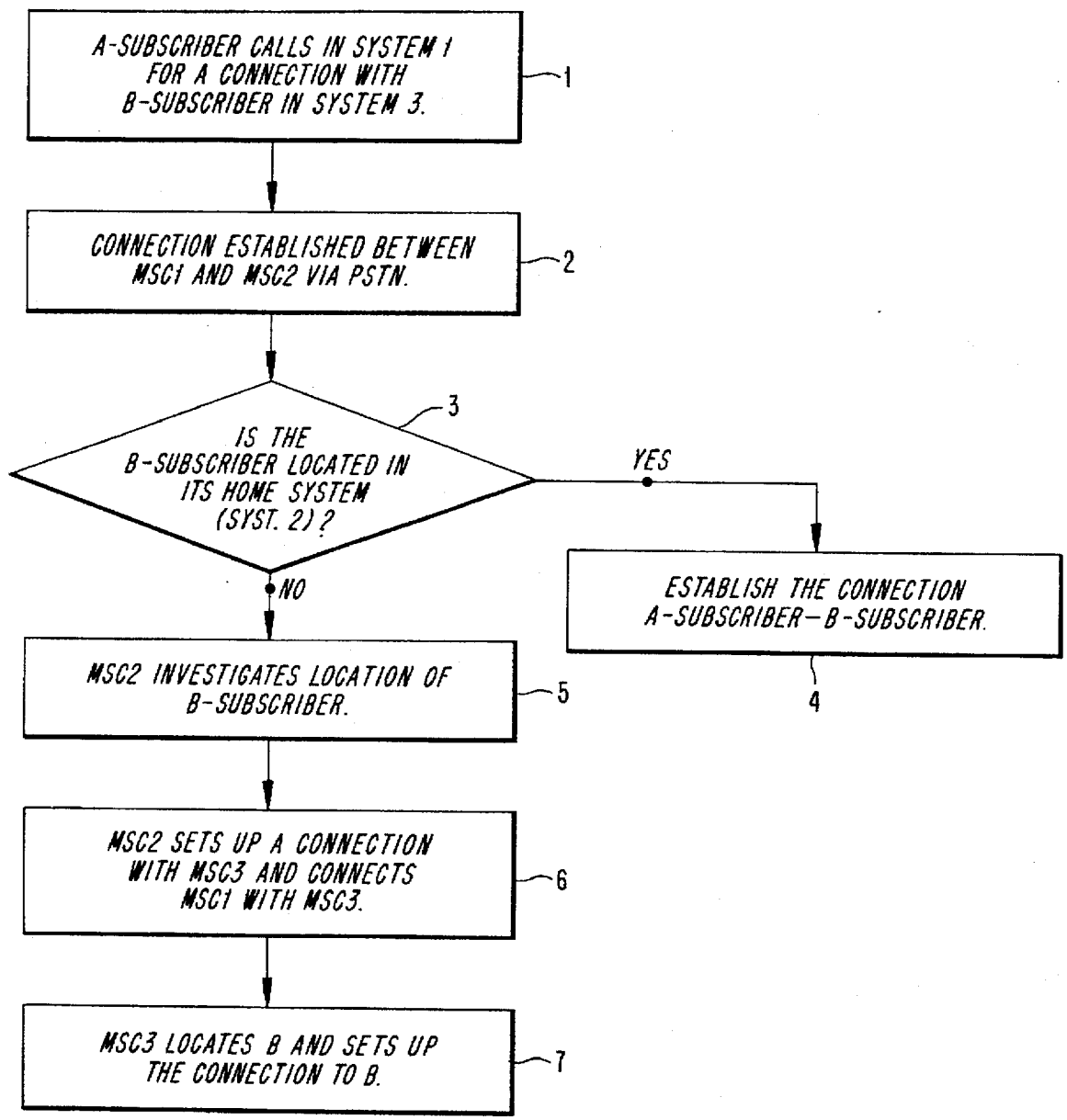
FIG. 2 is a flowchart associated with the systems according to FIG. 1 and illustrating a known method of setting calls.

If the subscriber A in system S1 wishes to set up a call to the subscriber B who has roamed into the system S3, as illustrated in FIG. 1, this can be achieved in accordance with the earlier known technique through the home system S2 of the B-subscriber, in accordance with the flowchart shown in FIG. 2.

In this flowchart, it is assumed that the mobile subscriber A will establish a connection with the subscriber B now located in system S3. Subscriber A therefore calls mobile services switching centre MSC1, which establishes a connection with the mobile services switching centre MSC2 in system S2 (block 2 in the flow-chart).

Because subscriber B belongs to the system S2, the mobile services switching centre MSC2 makes an inquiry at its home location register HLR2 and is informed that subscriber B is located in system S3 (blocks 3 and 5).

The mobile services switching centre MSC2 then connects the connection incoming from MSC1 to the mobile services switching centre MSC3 via PSTN. The mobile services switching centre MSC3 then connects the mobile subscriber B after having located subscriber B by making an inquiry in the visitor location register VLR3, and subscriber A has therewith been connected with subscriber B, block 6, 7 in FIG. 2. The operator of system S2 will therewith bill a certain fee for the time of the call over the connection from system S2 to system S3.

According to the proposed invention, mobile communication networks, for instance a network of the kind illustrated in FIG. 1, is provided with service nodes and terminals capable of cooperating with these nodes, i.e. a new subscriber service is introduced into those systems within which the subscribers can move when roaming from one system to another. Accordingly, transit exchanges, preferably PABX-exchanges, are introduced into the system complex illustrated in FIG. 1, these exchanges functioning as access nodes and service nodes for the subscribers of those systems served by each of the nodes. In the illustrative embodiment shown in FIG. 1, a node (PABX-exchange) solely serves a given system, although it will be understood that such a node may also be extended to serve several systems, each being characterized by its system identification number (SID).

In the present case, the designation PSTN stands for the public switched telephone network, in this case covering the whole of the U.S.A., including, among other things, local exchanges, transit exchanges and connections therebetween.

Connected to the PSTN-network is a known PABX-exchange, PABX1, so as to form a subscriber service node within the system S1. The exchange PABX1 may comprise, for instance, a so-called private exchange MD 110, which is described in "System ASB 501 04" with document number 1551-ASB50104 Uen from ERICSSON, and is connected, for instance, to a local exchange in the public network PSTN by means of a typical PABX-route to the local exchange. The subscriber A, whether a mobile subscriber or a wire-connected subscriber, is therefore able to connect with the PABX-exchange PABX1 in a conventional manner.

The private exchange PABX2 is also connected to the public services telephone network PSTN, for instance connected to a local exchange in the network PSTN in a similar manner as the private exchange PABX1 is connected to a local exchange in the PSTN-network at system S2. Finally, a service node is formed in the system S3 by connecting a private exchange PABX3 to the public network PSTN in a similar manner. The reference PSTN has the same significance in this case as that before mentioned.

Figure 6:
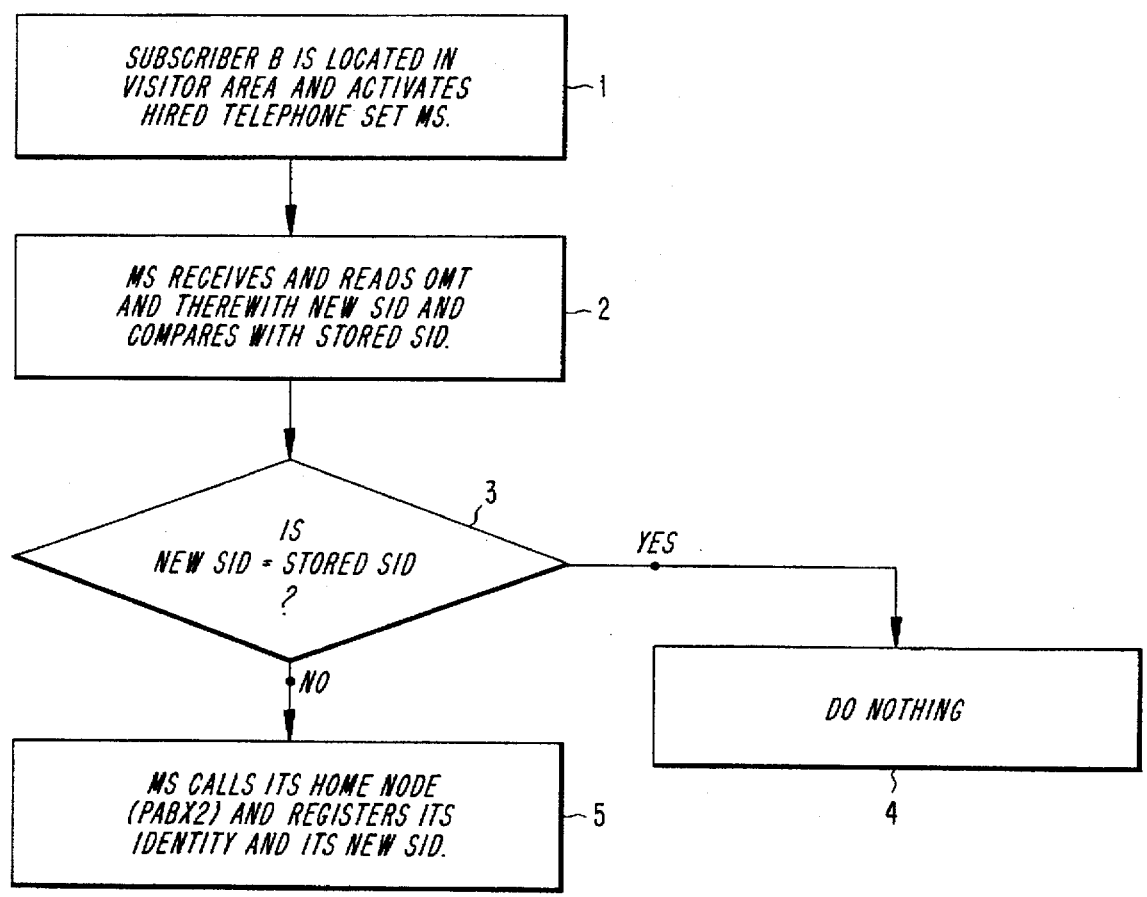
FIG. 6 is a flow chart which illustrates call registration in accordance with the invention.

The private exchanges PABX1–PABX3 store and update information concerning the functionality of associated subscribers, including the location of these subscribers. Updating of the country or region in which the subscribers are located is done by the subscribers themselves, either automatically or manually, for instance by dialling a code which gives access to the home node, i.e. in this case to the exchange PABX2, and which discloses to where the subscriber has moved, in this case to the region of the system S3. This will be described in more detail below, with reference to FIG. 6.

Updating can also be effected by associated (serving) mobile telephone exchanges, in the present case the exchange MSC2, with the aid of the register HLR2, for those mobile telephone subscribers who subscribe to this service with their mobile telephone operator. This assumes, however, that the mobile telephone operators cooperate in accordance with the inventive service. In this case, the subscribers are able to use known standard mobile telephone sets which need not register themselves (according to that described with reference to FIG. 6) in addition to the standardized registration.

A signal path S is formed between the nodes PABX1, PABX2 and PABX3, and may consist of existing data transmission connections with associated modem equipment in respective switching centres or exchanges PABX1, PABX2 and PABX3. Information concerning the place of residence and possibly also the functionality of the subscribers in respective systems is exchanged over this connection, from and to said exchanges. Thus, the subscriber B whose home system is S2 but who has moved to system S3 sends information to his home service node, i.e. the exchange PABX2, concerning this move. The service node of the subscriber B has a certain memory space and when the subscriber has roamed into another system, in this example system S3, the code for this system is written into the memory space. The service node of the system S1, i.e. the exchange PABX 1, is therefore able to collect information concerning roaming of the subscriber through the data connection S.

Similarly, when subscriber A belonging to system S1 has roamed into another system, subscriber A will inform his PABX of the code of the system into which he has roamed, this code being written into the memory space reserved for subscriber A in his PABX. The present invention is not concerned with such roaming, so this situation will not therefore be described here.

According to the aforegoing, the exchanges PABX1–PABX3 which form respective nodes of the systems S1–S3 can be considered as transit exchanges and as superior home registers HLR in addition to those registers HLR1–HLR3 which belong to respective systems S1–S3.

The case when a subscriber A wishes to establish a call connection in accordance with the proposed method will now be described in more detail with reference to the flowchart shown in FIG. 3.

The subscriber A, for instance a mobile telephone subscriber, calls his base station (not shown here) and is connected to the nearest mobile services switching centre MSC1. The call includes a service number which indicates that subscriber A wishes to be connected via the service given by the service node belonging to the home system S1 of the subscriber. See block 1 in the flowchart.

The service call is connected to PABX1, for instance over a local exchange in PSTN and a PABX-route, block 2 in the flowchart, and PABX1 sends to subscriber A a query concerning the number of subscriber B, block 3 in the flowchart.

The exchange PABX1 receives the number of subscriber B and signals to the exchange PABX2 over the signalling route S and learns that subscriber B has roamed into system S3. See blocks 4–5, 8 in the flowchart. When the exchange PABX2 indicates that subscriber B is located in his home system, "Yes", the call is connected via PABX1 and PABX2, according to blocks 6, 7 in FIG. 3.

When PABX1 establishes that subscriber B is located in system S3, ("No" in block 5), PABX1 requests a connection with PABX3 over the public switched telephone network PSTN. This is effected through a PABX-number, principally in the same known manner as that by means of which a normal subscriber would be connected from PABX1 to PABX3 by PSTN. However, PABX1 at the same time sends a request to PABX3 asking to be first connected with subscriber B in system S3, blocks 9, 10 in the flowchart. In this case, if PABX3 confirms that subscriber B is connected in system S3 ("Yes" at block 10), a connection is established (block 11) between the subscribers A and B over the route: A—MSC1—PSTN—TransitPABX1—PSTN—Transit—PABX3—PSTN—MSC3—B. This connection route has been shown with arrows in FIG. 1.

If the B-subscriber has not been connected by PABX3, this may be because the B-subscriber has not yet answered. A certain length of time is then allowed to pass before connecting the call through PABX1–PABX3, block 11.

The main difference between the novel call and call-connection method according to the present invention and the earlier known technique is that with the inventive system, the home system of the called subscriber B need not engage in any call-connecting procedure and need not be encumbered with call time which shall actually be handled by the visited system. The advantages afforded thereby are obvious. The extent to which the home system is occupied is considerably smaller for all roaming home subscribers, therewith greatly increasing the capacity of the home system for non-roaming home subscribers and for visiting subscribers which are unable to utilize the inventive method. Furthermore, the B-subscriber does not have to pay for the unnecessary additional cost of routing the call via the home system.

In another example of a communication network, there is found a subscriber A from a given country (France) who wishes to call a roaming subscriber B from his home country (Sweden), but who is located in a third country (Spain). Although the operators in these three countries are mutually different, the standard used by the three different systems in said countries is the same, similar to FIG. 1. The global mobile radio system GSM is taken as an example of a common standard, this standard being common to several European countries, such as Sweden, France and Spain, for instance. The principles of a service call to the service node PABX1, queries and call connection are the same as in the case illustrated in FIG. 1.

A third communication network case differs from the earlier cases in that, in addition to several countries and several operators, several standards are also applied. For instance, it can be assumed that the countries concerned are France which employs the GSM-standard, system S1, Sweden which employs the NMT-standard, system S2, and Italy which employs the TACS-standard, system S3.

In the case of three different standards, GSM, NMT and TACS, it is totally impossible to connect a call from subscriber A in France to a Swedish subscriber B who has roamed to Italy by means of the earlier known method. This is because the NMT-mobile telephone services switching centre MSC2 in Sweden is not programmed to connect a subscriber with the TACS-mobile telephone services switching centre MSC3 in Italy, compare FIG. 1. Thus, in this particular case, there is no realistic alternative to the inventive method.

In this third case, the inventive method is the same as that employed in the case according to FIG. 1. The only difference is that the service node PABX2 in Sweden sends to the French service node PABX1 the TACS-number which the Swedish subscriber uses in Italy in addition to the number of the node PABX3 in Italy.

The problem with which the exchange PABX1 is faced is that the exchange cannot know the TACS-number which the roaming subscriber B has been given in Italy. Subscriber B may have hired a TACS-set and been given a number which cannot be found available in exchange PABX1. Consequently, subscriber B effects a registration at his home service node, by calling the exchange PABX2 in a manner which will be described further on with reference to FIG. 6.

This exchange is then able, in turn, to inform PABX1 of the new subscriber B number, in accordance with the method earlier described in conjunction with signalling between PABX1 and PABX2.

It is assumed that the exchange PABX1 has been informed of the subscriber B TACS-number, in the aforesaid manner. The exchange PABX1 sends this number to the exchange PABX3, which with the aid of the mobile services switching centre MSC3 and associated home and visitor location registers HLR3, VLR3 establishes that subscriber B is located in Italy and calls the subscriber. The call is then connected in the same manner as that described with reference to FIG. 1.

The inventive method and inventive system of obtaining access to the service nodes PABX1–PABX3 requires minor modification to the mobile telephone set used in the mobile radio systems S1–S3 and having signed a subscription to the inventive services.

Figure 4:
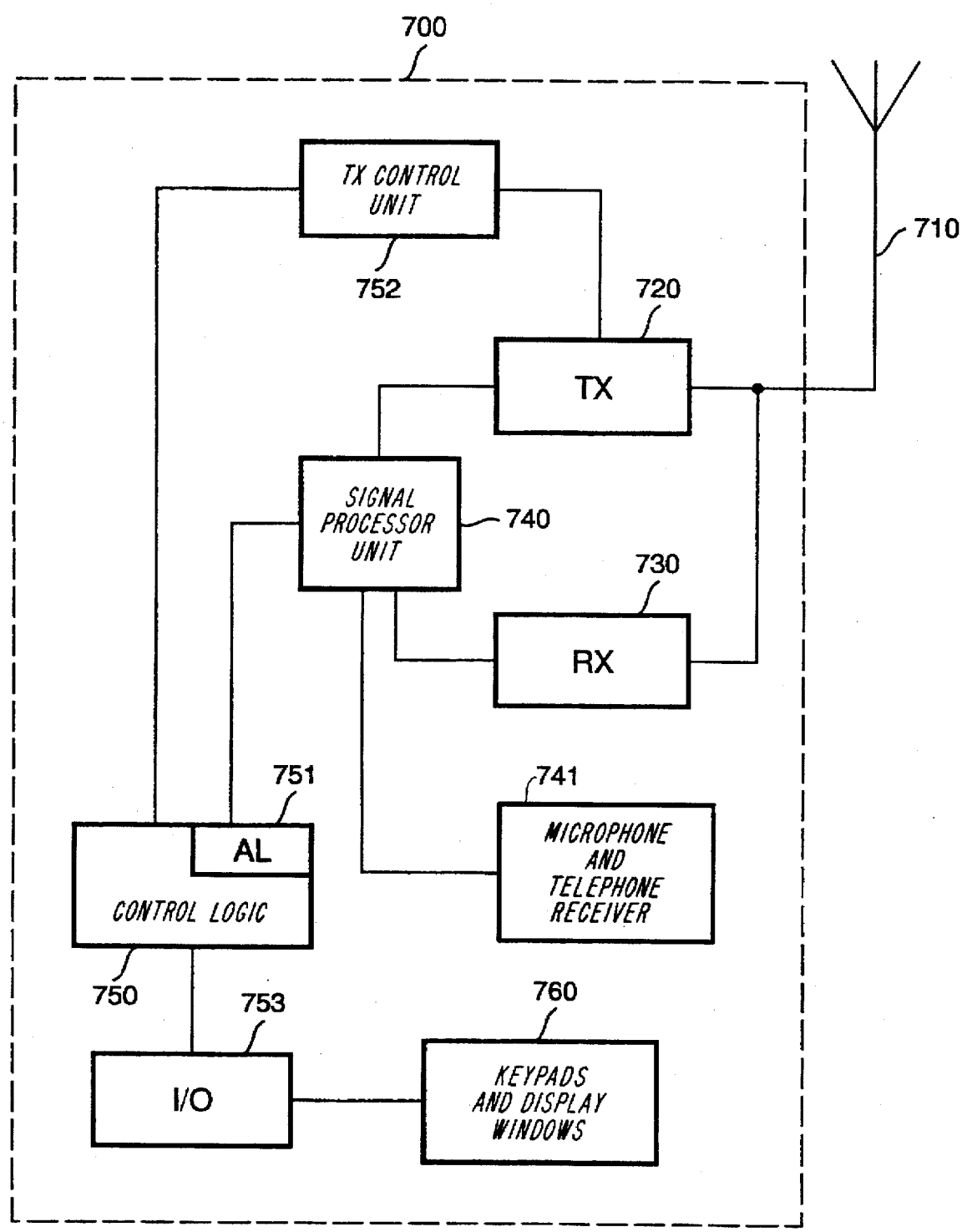
FIG. 4 is a block diagram which illustrates a known mobile telephone set that has been modified in accordance with the invention.

FIG. 4 is a block diagram which illustrates a known mobile station according to Swedish Patent Application 9200336-7, which has been modified so as to enable, e.g., subscriber A to use the mobile station in accordance with what has been described with reference to FIG. 1.

The mobile station 700 has an antenna 710. A transmitter 720 is connected to the antenna 710 and is controlled by a transmitter control unit 752. The transmitter is also connected to a signal processor unit 740. Similarly, a receiver is connected to the antenna and is used in time multiplex together with the transmitter. The receiver 730 is also connected to the signal processor unit 740. The blocks 720 and 730 also include radio equipment for modulating and demodulating, and equalizers.

The signal processor unit 740 includes channel coding, channel decoding and signal processing of speech in both an incoming and outgoing direction. The signal processor unit 740 is also connected to a microphone and telephone receiver in block 741, and to control logic 750. In turn, this control logic is connected to the transmitter control unit 752 and to an I/O-block 753 which adapts the signals for keypads and display windows in block 760. Modification of the mobile station in accordance with the invention is realized in the form of data or a program sequence in the control logic 750 and has been designated 751 "supplementary logic".

Figure 3:
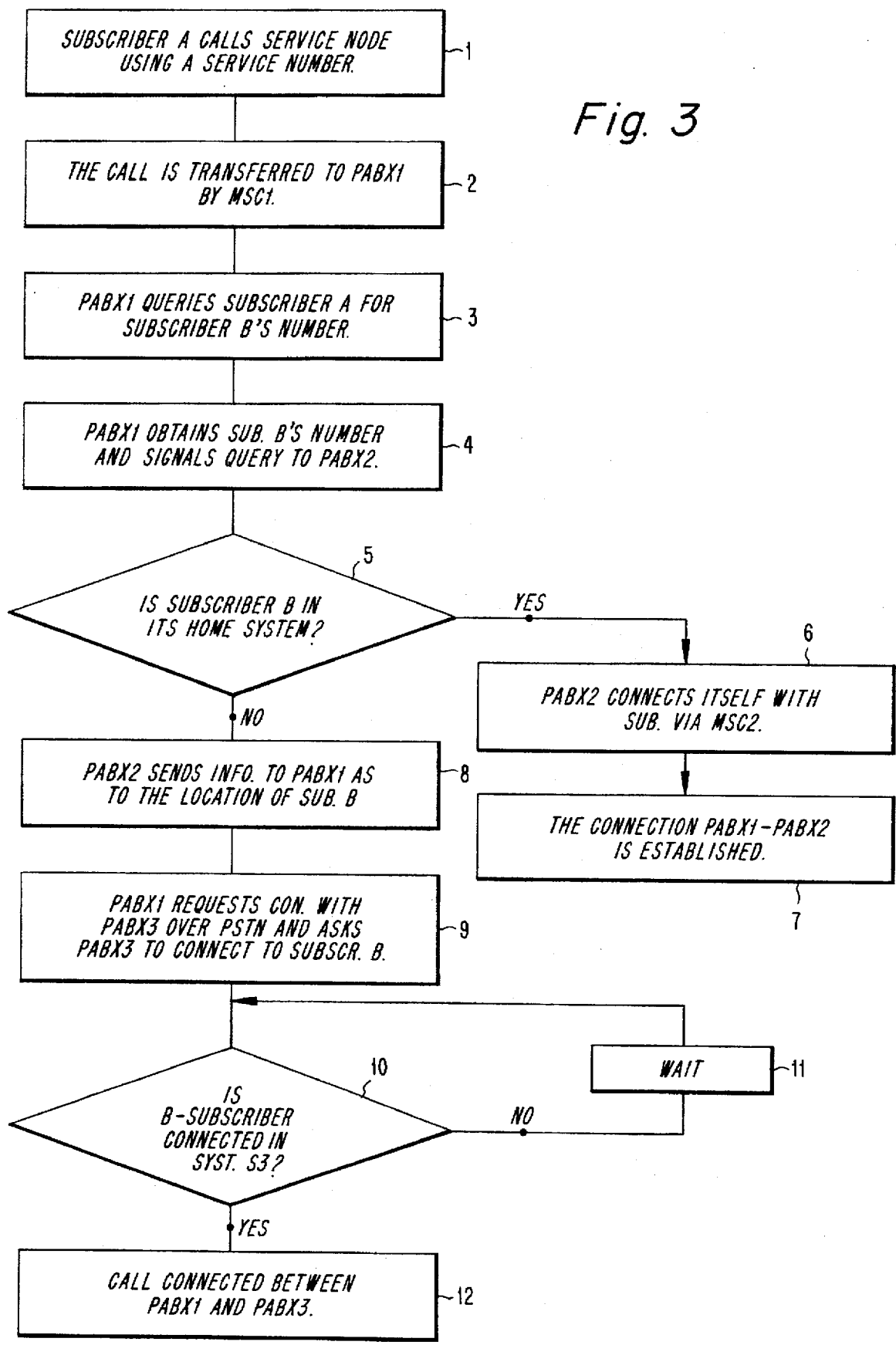
FIG. 3 is a flowchart associated with the systems according to FIG. 1 and illustrates the inventive method.
Figure 5:
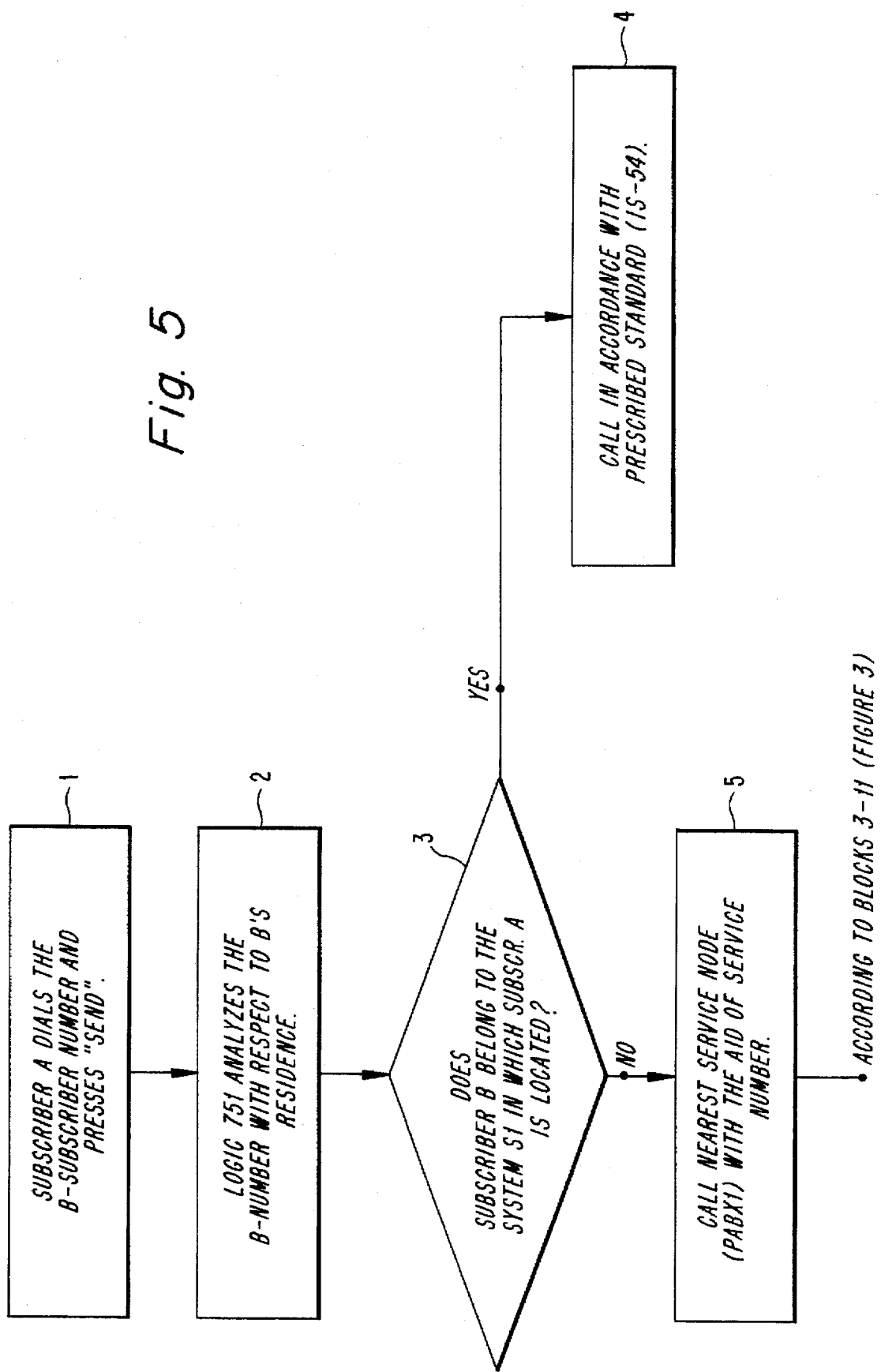
FIG. 5 is a flow chart which illustrates call connection in accordance with the invention.

The flowchart of FIG. 5 illustrates more clearly the method of operation of the mobile radio telephone set shown in FIG. 4 when its subscriber uses the service nodes according to FIG. 1 and the FIG. 3 flowchart.

The subscriber A in FIG. 1 wishes to make a call to the subscriber B who has roamed from his home region S1 to region S3, a fact of which subscriber A is unaware. Subscriber A dials the number of subscriber B on the keypad 760 of his telephone set, according to FIG. 4, and the number is analyzed by the AL-unit 751 in the mobile telephone set control unit 750. Blocks 1 and 2 in FIG. 5.

The logic 751 investigates whether or not the dialled subscriber number belongs to a subscriber within the same system S1 as the own subscriber is located, or whether the dialled number belongs to another system. In the FIG. 1 example, subscriber B belongs to system S2 (San Francisco) but has roamed to system S3 (Los Angeles), whereas subscriber A is located in system S1 (Chicago). If the logic 751 now finds that the dialled subscriber B is a foreign subscriber (i.e. a subscriber which does not have its home in system S1), "No" in block 3 of the FIG. 5 flowchart, the telephone set calls its nearest service node, i.e. in this case the PABX-exchange PABX1, by means of a typical call to such an exchange and over the public switched telephone network PSTN. The procedure then followed in connecting a call between subscriber A and subscriber B is the same as that earlier described with reference to FIG. 1. When the telephone set A has established that the called subscriber B belongs to the same system as subscriber A, "Yes" in block 3 of the flowchart, the B-subscriber is called in a fully normal and known manner in accordance with the standard prescribed for the system, block 4, in the illustrated case the American standard IS-54.

Each subscriber connected to the service which can be handled by the service nodes according to the above must register with these nodes in order for the service node of the calling subscriber to obtain information as to the system into which the called subscriber has roamed. Consequently, the subscriber telephone set, either a personally owned telephone set which has been carried to the visiting system or a hired telephone set, must have a program in its control logic 750 which carries out this registration. This is illustrated in the FIG. 6 flowchart. Compare, however, what has been said above with regard to the case in which the mobile telephone operators cooperate with one another and in which updating can be effected by associated mobile telephone exchanges.

It is assumed that subscriber B, who is connected to the services and is located in visitor system S3, has hired a telephone set which contains supplementary logic according to the aforegoing, and activates the telephone set with the intention of being able to receive incoming calls. The telephone set receives a so-called "overhead message train" (OMT, which is standard in the U.S.A.) from the mobile services switching centre MSC3 of the visitor system, this switching centre containing, among other things, the system identification number SID3. Stored in the telephone set is a system identification number SID2 for the preceding place of residence, in this case the system S2, and the telephone set ascertains whether or not these two identification numbers are the same, blocks 1–3 in FIG. 6. If the two identification numbers are the same, "Yes" in block 3, no further measures are taken by the telephone set. On the other hand, if the numbers are not the same, "No", the telephone set calls its home service node, i.e. the exchange PABX2, and registers itself with this exchange, since the subscriber is at home in system S2. The telephone set registers its identity and its system identification SID in the system S3 in which the subscriber is visiting.

When the subscriber roams into the visitor system S3 with his hired telephone set activated, registration is effected in the same manner as that described above, beginning with the telephone set reading the aforesaid OMT.

Registration in accordance with the aforegoing, i.e. transmission of the subscriber call and identity, can be effected conveniently over a traffic channel, as opposed to typical registration between a mobile station and a mobile telephone switching centre effected by means of standardized signalling.

Another type of call which may be necessary to effect in conjunction with the use of the service nodes in accordance with the invention is the so-called "characterization call". Such a call is primarily concerned with loading new data in the block AL in the mobile telephone set according to FIG. 4, primarily the telephone number of the nearest service node (PABX). Other parameters in the subscriber telephone set may also be concerned, however. A call of this nature can be initiated by a service node (PABX) or can be made in conjunction with the aforesaid registration procedure, when a given service node, for instance the exchange PABX2, is connected to the subscriber, in this case subscriber B, due to new SID-registration. The exchange PABX2 loads the logic in the control unit 751 of the subscriber telephone set with the new information according to the above.

The invention has been described with reference to examples in which the nodes are comprised of private exchanges PABX connected in the PSTN in the subscriber multiple. It will be obvious to those skilled in this art, however, that the nodes may alternatively be comprised of switches in the public switched telephone network PSTN, wherewith calls may be connected to these switches with a simple prefix in front of the desired B-number, for instance 300 010 3487685, where 300 is the prefix, or without any prefix at all when the public switched telephone network PSTN uses the inventive services for all subscribers.

The invention has also be described in the aforegoing with reference to examples in which the nodes are all found in the telephone network. It will be obvious to those skilled in this art, however, that the nodes may alternatively be connected to other networks, for instance to mobile data networks or to several networks simultaneously, as described in Swedish Patent Application 9200465-4 mentioned above. Among other things, this enables the B-subscriber to be paged in several networks simultaneously.

The storage function can also be centralized in the nodes, by combining information concerning the system in which the roaming subscriber B is located, from the individual PABX-exchanges (according to FIG. 1) to a remote central unit which is connected to PSTN.

What is claimed is:

1. A communication network comprising:

first, second and third mobile radio systems serving respective first, second and third areas, each of the first, second and third mobile radio systems including a mobile radio services switching center;

a land-based public switched telephone network, connected to each of the first, second and third mobile radio services switching centers, for performing tele-traffic services with the first, second and third areas; and first, second and third telecommunication node means in respective correspondence with the first, second and third mobile radio systems and connected to the public switched telephone network, each one of the first, second and third telecommunication node means being directly accessible to a caller by means of the public switched telephone network without requiring a connection through any of the first, second and third mobile radio systems, and each one of the telecommunication node means comprising:

first means for storing called subscriber home system functional information pertaining to a called subscriber having a home system that is the corresponding one of the first, second and third mobile radio systems;

second means for storing called subscriber addressing information for routing a call to a visiting system into which the called subscriber has roamed;

communication means for communicating with the called subscriber in order to receive the called subscriber addressing information; and switch means, responsive to said one of the first, second and third telecommunication node means being accessed by the caller, for establishing a connection between the caller and the called subscriber, wherein;

the switch means includes means for communicating the called subscriber addressing information with another of the telecommunication node means; and the established connection bypasses the called subscriber's home system and includes a connection between at least one of the first, second and third telecommunication node means and the called subscriber.

2. The communication network of claim 1, wherein each of the first, second and third mobile radio systems further includes a home location register for storing information relating to the location of the associated called subscriber and for providing the stored information to the mobile radio services switching center of a respective one of the first, second and third mobile radio systems, and wherein the communication network includes first, second and third superior home location registers in respective correspondence with the first, second and third mobile radio systems, for storing the called subscriber addressing information of the associated called subscriber of the corresponding one of the first, second and third mobile radio systems, each of the first, second and third superior home location registers operating independently of the first, second and third mobile radio systems.

3. The communication network of claim 2, wherein each of the first, second and third superior home location registers is located within a corresponding one of the first, second and third telecommunication node means.

4. The communication network of claim 2, wherein the first, second and third superior home location registers are disposed at a central location that is accessible to each of the first, second and third telecommunication node means.

5. The communication network of claim 1, wherein:

each of the first, second and third telecommunication node means is an exchange having an incoming and an outgoing communication route, each coupled to the public switched telephone network;

the called subscriber of the second telecommunication node means has roamed into the third mobile radio system, whereby the third mobile radio system becomes the called subscriber's visiting system;

in response to the caller accessing the first telecommunications node means for the purpose of establishing the connection between the caller and the called subscriber of the second telecommunication node means, the first telecommunications node means establishes a signalling route through the public switched telephone network between the first and second telecommunications node means;

the first telecommunications node means uses the signaling route to obtain the called subscriber addressing information from the second telecommunications node means; and the first telecommunications node means uses the called subscriber addressing information to establish the connection between the caller and the called subscriber, wherein the established connection bypasses the called subscriber's home system.

6. The communication network of claim 5, wherein each of the exchanges is an exchange within the public switched telephone network.

7. The communication network of claim 5, wherein at least one of the exchanges is a private automatic branch exchange.

8. In a communication network comprising first, second and third mobile radio systems which are interconnected by a public switched telephone network, a method of establishing a telephone connection between a caller, and a called subscriber whose home system is the second mobile radio system but who has roamed to the third mobile radio system, comprising the steps of:

a) after the called subscriber has roamed into the third mobile radio system, establishing communication between the called subscriber and a second service node that is connected to the public switched telephone network and that corresponds to the second mobile radio system, and then using the communication to convey information for storage into the second service node, the stored information comprising subscriber addressing information for routing a call to the called subscriber in the third mobile radio system;

b) using the public switched telephone network to connect the caller to a first service node that corresponds to the first mobile radio system and that is connected to the public switched telephone network;

c) relaying, from the caller to the first service node, information regarding the identity of the called subscriber;

d) sending, from the first service node to the second service node by means of the public switched telephone network, a query regarding the present location of the called subscriber;

e) sending in response to the query, from the second service node to the first service node, the subscriber addressing information; and f) using the subscriber addressing information to establish a traffic connection between the caller and the called subscriber, the established traffic connection including a path through the first service node, wherein the established traffic connection bypasses the called subscriber's home system.

9. The method of claim 8, wherein the second mobile radio system is the same as the first mobile radio system.

10. The method of claim 8, wherein the step of using the public switched telephone network to connect the caller to the first service node includes using a service number associated with the first service node.

11. In a communication network comprising first, second and third mobile radio systems which are interconnected by a public switched telephone network, the communication network further comprising first, second and third service nodes in respective correspondence with the first, second and third mobile radio systems and each of the first, second and third service nodes being connected to the public switched telephone network for establishing a call between a caller and a called subscriber whose home system is the second mobile radio system but who has roamed to the third mobile radio system, wherein the established call bypasses the called subscriber's home system and includes a connection between at least one of the first, second and third service nodes and the called subscriber, a method of registering a mobile telephone set of the called subscriber in the communication network, comprising the steps of:

registering the mobile telephone set with a visitor location register of the third mobile radio system and with a home location register of the second mobile radio system;

accessing, by the mobile telephone set, the third mobile radio system to obtain therefrom information relating to system identity of the third mobile radio system; and calling, by the mobile telephone set, the second service node and transmitting thereto the obtained information.

12. The method of claim 11, wherein the step of accessing further comprises the step of obtaining from the third mobile radio system a telephone set identity, and the step of transmitting includes the step of transmitting the obtained telephone set identity to the second service node.

13. In a communication network comprising first, second and third mobile radio systems which are interconnected by a public switched telephone network, a method of establishing a telephone connection between a calling subscriber who is served by the first mobile radio system, and a called subscriber whose home system is the second mobile radio system but who has roamed to the third mobile radio system, comprising the steps of:

a) after the called subscriber has roamed into the third mobile radio system, establishing communication between the called subscriber and a first local switch that is connected to the public switched telephone network and that corresponds to the third mobile radio system, and then using the communication to relay, from the called subscriber to the first local switch, subscriber addressing information for routing a call to the called subscriber in the third mobile radio system;

b) using the public switched telephone network to establish a first signalling route between the first local switch and a superior home location register that is connected to the public switched telephone network;

c) using the first signalling route to transfer the subscriber addressing information from the first local switch to the superior home location register;

d) using the public switched telephone network to connect the calling subscriber to a second local switch that is connected to the public switched telephone network and that corresponds to the first mobile radio system;

e) relaying, from the calling subscriber to the second local switch, information regarding the identity of the called subscriber;

f) using the public switched telephone network to establish a second signalling route between the second local switch and the superior home location register;

g) using the second signalling route to transfer the subscriber addressing information from the superior home location register to the second local switch;

h) in the second local switch, using the subscriber addressing information to establish a traffic connection between the calling subscriber and the called subscriber, wherein the established traffic connection bypasses the called subscriber's home system.

14. In a communication network comprising first, second and third mobile radio systems which are interconnected by a public switched telephone network, the communication network further comprising a local switch connected to the public switched telephone network and a superior home location register connected to the public switched telephone network, a method of registering a mobile telephone set of a called subscriber whose home system is the second mobile radio system but who has roamed to the third mobile radio system, the method comprising the steps of:

registering the mobile telephone set with a visitor location register of the third mobile radio system and with a home location register of the second mobile radio system;

accessing, by the mobile telephone set, the third mobile radio system to obtain therefrom information relating to system identity of the mobile telephone set in the third mobile radio system; and calling, by the mobile telephone set, the local switch that is connected to the public switched telephone network and transmitting thereto the obtained information;

using the public switched telephone network to establish a second signalling route between the local switch and the superior home location register that is connected to the public switched telephone network; and using the second signalling route to transfer the obtained information from the local switch to the superior home location register.

15. A communication network comprising:

first, second and third mobile radio systems serving respective first, second and third areas, each of the first, second and third mobile radio systems including a mobile radio services switching center;

a land-based public switched telephone network, connected to each of the first, second and third mobile radio services switching centers, for performing teletraffic services with the first, second and third areas; and first, second and third switch means in respective correspondence with the first, second and third mobile radio systems and connected to the public switched telephone network, each one of the first, second and third switch means being directly accessible to a caller by means of the public switched telephone network without requiring a connection through any of the first, second and third mobile radio systems, and each one of the switch means comprising:

first communication means for communicating with the called subscriber in order to receive the called subscriber addressing information;

second communication means for communicating the called subscriber addressing information with telecommunication node means; and means, responsive to said one of the first, second and third switch means being accessed by the caller, for obtaining the called subscriber addressing information from the telecommunication node means and establishing a connection between the caller and the called subscriber, wherein the established connection bypasses the called subscriber's home system and includes a connection between at least one of the first, second and third switch means and the called subscriber; and the telecommunication node means, connected to the public switched telephone network, the telecommunication node means comprising:

first means for storing called subscriber home system functional information pertaining to a called subscriber having a home system that is one of the first, second and third mobile radio systems;

second means for storing called subscriber addressing information for routing a call to a visiting system into which the called subscriber has roamed; and communication means for communicating the called subscriber addressing information with the first, second and third switch means.

16. The communication network of claim 15, wherein each of the first, second and third mobile radio systems further includes a home location register for storing information relating to the location of the associated called subscriber and for providing the stored information to the mobile radio services switching center of a respective one of the first, second and third mobile radio systems, and wherein the telecommunication node means comprises a superior home location register for storing the called subscriber addressing information, the superior home location register operating independently of the first, second and third mobile radio systems.

* * * * *